United States Patent Office

3,498,935
Patented Mar. 3, 1970

3,498,935
METHOD OF PRODUCING POROUS STRANDS FROM A COAGULATED RUBBER LATEX
Theo Noble, Gottfried Scriba, Theodor Konig, and Hermann Holzrichter, Leverkusen, Germany, assignor to Farbenfabriken Bayer Aktiengesellschaft, Leverkusen, Germany, a corporation of Germany
No Drawing. Continuation-in-part of application Ser. No. 196,595, May 22, 1962. This application Feb. 21, 1967, Ser. No. 617,505
Claims priority, application Germany, June 8, 1961, F 34,111
Int. Cl. C08d *13/08, 7/00*
U.S. Cl. 260—2.5                                5 Claims

ABSTRACT OF THE DISCLOSURE

Production of porous strands of a coagulate from an emulsified rubber latex by adding an inorganic salt electrolyte solution to the latex and, prior to any substantial coagulation, passing resulting mixture through a flow pipe under laminar flow conditions for a specified residence time.

---

This application is a continuation-in-part of application Ser. No. 196,595 filed May 22, 1962 and now abandoned.

The present invention is directed to an improved method of preparing coagulates of synthetic rubber latices. The coagulates are obtained in the form of a continuous soft porous strand capable of being broken up into suitable size pieces by agitation in water. These pieces may easily be fed into a worm extruder and thus facilitate drying and processing of the rubber obtained.

It has been known for a long time to process latices of natural or synthetic rubbers by coagulation to form solid rubber by adding inorganic salt solutions, washing out the coagulate and drying it by thermal or mechanical and thermal methods. As is also known, the coagulating can be carried out under conditions forming a finely divided coagulate which is united on screening bands to form a thin strip. This strip is washed and then dried in hot air drying chambers.

In another method of working up, worm-type machines are used in which the moist coagulate is dried by being squeezed mechanically and heated, optionally in vacuo. In this process, however, the coagulate is required in a coarser form which can still be washed satisfactorily. If the coagulate is too finely divided, it cannot be washed without causing clogging and losses in the screening plants. Further losses are caused during the feeding into the worm-type drying apparatus and also stoppages in the waste water pipes are unavoidable. The physical form and consistency of the coagulate is therefore of decisive importance for the operation of a continuously operating plant for processing rubber.

The object of the pressent invention is a continuous coagulation process for rubber latices, which serves for the production of coagulates which are excellently suitable for working up on worm-type machines.

It has now been found that a coarsely divided but nevertheless porous coagulate can be obtained successfully if a rubber latex is mixed with an aqueous electrolyte solution under predetermined conditions by a simple mixing assembly and if the coagulation is allowed to take place in a flow pipe connected to the mixing assembly. By a correct choice of the residence time in the mixing assembly and flow pipe, the coagulate leaves the said pipe as a soft, porous but completely coagulated strand. This strand can easily be broken up into small pieces by mechanical stirring in a subsequent washing vessel without the formulation of finely divided rubber particles which can lead to clogging of screens and pipes.

The conditions under which a continuous process strand of coagulate are obtained are set forth below.

A soft continuous porous strand of material is understood to be a strand of the outward shape of the flow pipe, i.e. generally of circular cross-section. This strand has the outward appearance of a sponge with very irregularly distributed pores of varying size (about 0.1 to 5 mm. diameter). The strand has practically no mechanical strength and breaks down into pieces, either on agitation in water or even when suspended under its own weight. The pieces generally conform, in cross section, to the shape of the strand (or to the shape of the flow pipe) and are about 1 mm. to about 30 mm. in diameter. Those pieces have a mechanical strength which is sufficient to leave them substantially unchanged in a washing and filtering operation as the initial breaking occurs at the weakest point of the strand.

The conditions under which this type of coagulate is obtained are as follows:

(1) The latex concentration must be between 15 and 30% preferably between 18 and 25% by weight, based on the weight of dry rubber present in the latex.

(2) The electrolyte coagulant must be an inorganic salt, which is soluble in water and is used as an aqueous solution of preferably 1 to 30% by weight salt content.

(3) The amount of inorganic salt should be between 0.5 and 1.2, preferably 0.7 and 0.9 part by weight per part by weight of solid rubber in the latex.

The coarse rubber particles obtained can be freed very satisfactorily from any adhering electrolyte solution by washing because of their porous structure which is produced by the coagulation method of the present invention. This coagulation method requires a considerably smaller quantity of electrolyte than other processes. Whereas a salt-polymer weight ratio of about 3:1 has to be maintained with conventional coagulation processes in order to obtain a coagulate which can be worked up in a technically satisfactory manner, salt-polymer ratios in the order of magnitude of 0.5 to 1.2 is all that are required by the present invention.

In principle, a relatively small quantity of electrolyte solution is sufficient for the coagulation of rubber latices. However, when using these minimum quantities in stirrer-type vessels, the coagulate combines to form very coarse and compact agglomerates, which are completely unsuitable for further processing on an industrial scale. In order to avoid these compact and coarse agglomerations, it has already been proposed to use relatively dilute latex concentrations. This, however, necessitates higher proportions of electrolyte, since, if the electrolyte concentration of the total coagulation mixture falls below a certain minimum value, precipitation would not be complete.

If coagulation of the latex is carried out according to the present invention with the minimum quantity of salt solution necessary for coagulation in the pipe through which it flows, the undesired agglomeration is avoided and a coagulate in strand form with a soft and porous structure is formed. It is surprising that under such conditions, a product is obtained which is agglomerated to a coherent strand, but still freely mobile without danger of clogging the pipe, and that this strand still had the necessary porosity for subsequent removal of the precipitation agents and emulsifiers.

In accordance with the present invention an aqueous solution of an inorganic salt is continuously mixed with a stream of the latex to be coagulated. The mixing of the electrolyte solution with the polymer latex is advantageously effected in a mixing nozzle, which is known per se. This mixture, prior to any substantial coagulation, is then passed through a relatively narrow flow pipe. The cross-section and residence time in the flow pipe are so chosen that coagulation is complete on leaving the flow or precipitation pipe. The quantity of the inorganic salt solution is of course adapted to the actual properties of the latex to be coagulated, within the specified limits. The length and the cross-section of the flow pipe and the throughput per unit of time determine the residence time of the coagulation mixture in the pipe and are therefore also to be adapted to the specific case, according to colloidal and chemical properties of the latex. Latices which are more difficult to coagulate are therefore coagulated with larger salt quantities per unit of solid rubber or the residence time in the flow pipe is increased. The converse naturally applies to latices which can be more easily coagulated. The residence time within the flow pipe generally is between 2 and 20 seconds and preferably between 4 to 10 seconds. The length of the pipe has to be chosen accordingly.

In accordance with the process described, latices of various elastomeric pure polymers or copolymers of butadiene, of 2-methyl butadiene and also of 2-chlorobutadiene can be coagulated in an industrially and economically advantageously manner. Of particular industrial interest in this respect is the coagulation of copolymer latices of butadiene and styrene and/or acrylonitrile as well as copolymer latices which contain, as well as these monomers, other comonomers such as acrylic acid and methacrylic acid, as well as the esters and amides of these acids, incorporated by polymerisation. Obviously, copolymers of butadiene with these esters or acids can also be worked up by the process described, even when styrene and acrylonitrile comonomers are not present. In addition to the pure copolymer latices, also to be considered here are blends of different latices or dispersions. In this respect, blends with suspensions of oils or also latices of thermoplastic copolymers, such as the pure polymers and copolymers of vinyl chloride or styrene, deserve particular mention.

There is also a wide latitude as regards the colloidal and chemical nature of the latices to be coagulated as determined by the emulsifiers used. Although in general, any of the emulsifiers commonly used for preparing the aforementioned latices are suitable, preferred emulsifiers include the long-chain alkyl sulphonic acids ($C_{12}$–$C_{20}$), the long-chain alkyl sulphates ($C_{12}$–$C_{20}$), the aralkyl sulphonic acids, and the disulphonic acids of diaryl methanes; the aforementioned emulsifiers are preferably used in the form of the free acids or their alkali metal and ammonium salts. Mixtures of these emulsifiers may also be used. Generally, the emulsifier content of such latices is between 4 and 10% by weight, preferably between 5 and 8% by weight.

The alkali metal and ammonium salts of the longer-chain ($C_{14}$–$C_{20}$) saturated and unsaturated carboxylic acids may also be used, as well as the alkali salts of disproportionated or hydrogenated abietic acid. Non-ionic emulsifiers, such as the adducts of polyethylene glycol with long-chain alcohols ($C_{12}$–$C_{20}$) or alkyl phenols, as well as the sulphates derived therefrom can also be employed. As is customary, the emulsifiers mentioned herein are usually employed in combination with one another. The stability of the resulting latices depends in known manner on the nature and quantity of the emulsifiers introduced, and it is in addition also determined by the salt additives in the aqueous phase of the polymerisation mixture. Most preferred, however, are emulsifier systems which contain, related to 100 parts of polymer, at least 0.5 part of the aforementioned alkyl or alkylaryl sulphonic acids or sulphates and/or 0.5 part of the likewise mentioned non-ionic emulsifiers or their sulfates. The presence of these emulsifiers in the emulsifier system of the latices to be coagulated is of great importance for the average size of the coagulate particles according to the present invention. For example, if latices containing exclusively the salts of higher organic carboxylic acids as emulsifiers are precipitated by admixing aqueous sodium chloride solution according to the present invention, a very finely divided coagulate is obtained. However, if 0.2 to 5 parts (related to 100 parts of polymer) and advantageously 0.5 to 2 parts of the said emulsifiers with the grouping —$SO_3H$ or —$(CH_2CH_2)_xH$ are added to the same latex, the coagulate is obtained in a form having coarser grains which can be more easily procsesed on an industrial scale. The addition of these latter emulsifiers imparts a greater strength to the strand of a coagulate issuing from the flow pipe, so that it is not broken down into fine particles during washing. It has furthermore been found that it is not important as regards the working up of the latices according to the invention whether the said emulsifiers are introduced into the polymer during the production of the latex or whether they are only added immediately before the working up operation.

Suitable coagulation agents are aqueous solutions of inorganic salts, being at least 90% dissociated or their mixtures as exemplified by sodium chloride, calcium chloride, sodium sulfate, magnesium sulfate, aluminium sulfate. The aqueous mixtures of these salts contain preferably 1–30% (column 2, lines 22–24) most preferably 15–20%, by weight of the salt. Most preferred is sodium chloride and calcium chloride.

The inorganic salts which are used in a specific case for the coagulation depend especially on the electrolyte stability of the latex. As with all hitherto usual coagulation processes, the concentration of these salt solutions and also the empirical ratio between salt and precipitated rubber must be adapted to the electrolyte stability of the latex to be coagulated, within the limits already indicated.

The mixing nozzle to be used for the present process should be of the appropriate construction so as to guarantee an immediate thorough mixing of the two liquids. In accordance with one preferred embodiment of the present invention, the polymer latex discharges through the nozzle and the electrolyte solution serving for the coagulation flows around it.

In one constructional form of the mixing assembly which has proved especially suitable, the nozzle opening is 2.5 to 15 cm.² Connected to the nozzle outlet is a preferably straight flow pipe, having a length which corresponds to a predetermined residence time of the latex therein. Thus, the length of the flow pipe should be such that it produces a residence time of 2 to 20 seconds and advantageously 4 to 10 seconds. The cross-section of this flow pipe should be 6 to 30 mm. and advantageously 10 to 30 mm. The flow in this pipe must be laminar; generally the flow velocity is between 0.3 and 1.0 m./sec. The coagulation process according to the invention is preferably used for precipitating butadiene-acrylonitrile copolymer latices, containing 15 to 30% and preferably 18–25% by weight of the polymer and an emulsifier system comprising alkyl or alkylaryl sulfonic acids and the salts of aliphatic carboxylic acids ($C_{12}$–$C_{20}$). The mixing assembly and the flow pipe are preferably dimensioned as set forth below if a 15% by weight sodium chloride solution is used as coagulating agent:

| | |
|---|---|
| Nozzle cross-section mm. | 30 |
| Flow-pipe cross-section mm. | 30 |
| Residence time sec. | 4.5 |
| Ratio between sodium chloride and solid rubber | 0.6:1 |

The coagulate leaves the flow pipe in the form of a soft, porous strand which is free from residual latex. In the connected washing and screening installations, this soft strand is broken by mechanical stirring in water to provide short pieces and the pieces are washed free of coagulant and emulsifier. No fragments of such a small size as to cause clogging of the washing screens are formed. It has to be noted that the flow in this pipe and in the other pipes used is laminar flow. Under turbulent flow conditions a porous strand could not be formed.

The washed pieces of coagulate are accommodated in a particularly easy manner by single-spindle or two-spindle worms, i.e. the normal commercial rubber drying installations. Because of the relatively constant size of the pieces and the absence of relatively large pieces, there is no clogging of the filling hopper.

As a further advantage of the process, no flushing away of finely divided coagulate can occur (as there is no such coagulate material present). This avoids clogging of pipe and conduits and loss of material.

The parts mentioned in the following examples are parts by weight, unless otherwise indicated.

(f) Experiment (d) is modified by conducting the coagulation mixture at different velocities through the flow pipe, so that different residence time are obtained. The result is indicated by the following table.

| Residence time | 2 sec. | 4 sec. | 10 sec. | 20 sec. | 30 sec. |
|---|---|---|---|---|---|
| Flow velocity | 1.2 m./sec. | 0.6 m./sec. | 0.24 m./sec. | 0.12 m./sec. | 0.08 /m./sec. |
| Precipitation | Not entirely complete | | | Complete | |
| Nature of the coagulate: | | | | | |
| (a) Fine particles | Many | Few | Few | Very few | Very few. |
| (b) Coarse particles | | In strand form | Porous | Non-aggluatinating | |

These Examples 1(a–f) show that a continuous mixing of the latex and of the sodium chloride solution by a mixing nozzle is necessary and that a residence time of the coagulation mixture in the flow pipe of 4 seconds up to 30 seconds leads to best possible properties of the coagulate.

EXAMPLE 1

Comparison experiments (a) 100 parts of latex of a copolymer of 38 parts of acrylonitrile with 62 parts of butadiene (Defo-value 500) with a polymer content of 30% (the latex also contains, related to 100 parts of the polymer, 4 parts of diisobutyl-naphthalene sulfonic acid and 1 part of normal commercial sodium salt of coconut fatty acid) are added to 120 parts of a 15% aqueous sodium chloride solution in a stirrer-type vessel while stirring. The latex is thereby coagulated and, within a short time, is formed into agglomerates which becomes increasingly larger and more dense, and the agglomerates can no longer be washed out and also can no longer be comminuted without using special equipment.

(b) The above experiment is repeated with the same quantities and qualities, but with the difference that now the latex is initially placed in the stirrer-type vessel and the sodium chloride solution is added while stirring. In this way, there is also formed an agglomerated coagulate which is unsuitable for use in an industrial working-up process.

(c) The same experiment is repeated, but with the difference that the latex and sodium chloride solution are simultaneously run into the stirrer-type vessel. In this way, a coagulate which combines into coarse agglomerates is also obtained.

(d) The coagulation is repeated with the copolymer latex referred to above, the mixing being carried out continuously in a simple mixing nozzle. In this case, the sodium chloride solution is introduced laterally into the mixing chamber, while the latex is forced through the actual nozzle pipe into the mixing chamber. Connected to the outlet end of the mixing chamber is a flow pipe with an internal diameter of 11 mm. and a length of 2.4 m.

The mixing ratio corresponds to the ratio between latex and sodium chloride solution indicated under (a). The inflow velocity into the mixing nozzle is so arranged that the coagulation mixture flows through the flow pipe in a period of 4½ seconds. A thoroughly coagulated porous strand is obtained. This strand can now be introduced into a stirrer-type vessel containing water. Under the influence of the stirring action, the strand of coagulate is broken up into pieces having an average length of 2 cm. and a diameter of about 0.8 cm. The short pieces are porous and can easily be washed, and after washing out sodium chloride they can be introduced easily into the worm-type machines, used for work-up.

(e) If the experiment (d) is now repeated, but with the difference that the flow pipe connected to the mixing nozzle is omitted, it is found on introducing the coagulation mixture into a stirrer-type vessel containing water that the precipitation is not complete and that the coagulate which has formed sticks together to form large agglomerations.

EXAMPLE 2

A copolymer of 70 parts of butadiene and 30 parts of styrene (Defo-value 700) is coagulated as follows in the form of a latex with a solid content of 32%, using 5% (based on the polymer) of disproportionated sodium salt of abietic acid and 0.2% of the sodium salt of dinaphthyl-methane disulfonic acid as emulsifier: the apparatus described under Example 1(d) is used for the precipitation. A 20% aqueous sodium chloride solution serves for the coagulation. The ratio between sodium chloride and solid rubber is adjusted to 1:0.95. Residence time in flow pipe: 3 seconds. The coagulate issuing from the flow pipe is in the form of a strand and porous and does not contain any relatively fine particles.

EXAMPLE 3

Using the arrangement described under 1(d), a polymer mixture having the following composition is coagulated: 280 parts of a latex of a copolymer of 72 parts of butadiene and 28 parts of acrylonitrile, the latex being 25% based on polymer content, are mixed with 40 parts of a dispersion containing 60% of polyvinyl chloride. This mixture is coagulated by the continuous addition of an 18% aqueous sodium chloride solution at a temperature of 35° C., a mixing ratio of 0.8 part of sodium chloride to 1 part of blended copolymer being maintained.

The flow pipe discharges a porous strand of a coagulate free from residual latex. On entering a stirrer-type vessel containing water, this strand is broken up by the stirring into pieces with an average length of 1.5 cm. and a diameter of 11 mm. fine coagulate particles are not formed.

EXAMPLE 4

A latex of a copolymer of 72 parts of butadiene, 28 parts of acrylonitrile, a polymer content of 25% by weight and an emulsifier content of 3 parts of sodium hexadecyl sulfonate (related to 100 parts of polymer) is continuously coagulated in the following manner: the latex is mixed with a 12% aqueous solution of calcium chloride by means of a mixing nozzle and the coagulation mixture is conducted through a flow pipe with a diameter of 11 mm. and with a residence time of 3 seconds. The proportion between polymer and calcium chloride is adjusted to 1:0.8. The coagulate then discharges from the flow pipe in the form of a porous strand.

EXAMPLE 5

(a) A latex of a pure polymer of 2-chlorobutadiene, containing as emulsifier 4 parts of the sodium salt of normal commercial disproportionated abietic acid and 0.3 part of the sodium salt of dinaphthyl-methane disulfonic acid (based on 100 parts of polymer) is mixed by a mixing nozzle for continuous precipitation with a 10% aqueous solution of 0.2 part of sodium hexadecyl sulfonate and 0.2 part of the adduct of 20 mols of ethylene oxide with benzyl-o-oxy-diphenyl (both related to the 100 parts of polymer in the latex). Immediately following this mixing operation, the mixture having a polymer content of 20% is thoroughly mixed in another mixing nozzle with a 12% aqueous sodium chloride solution in the ratio of 1 part of polymer to 0.75 part of sodium chloride. The mixture remains 5 seconds in a flow pipe connected to this mixing nozzle and leaves the pipe in the form of a strand-like latex-free coagulate, with which only a small amount of fine constituents are admixed.

(b) The mixing operation referred to in 5(a) is repeated, but is modified by continuously admixing a 10% solution of 0.1 part of sodium hexadecyl sulfonate (based on polymer) with the polychlorobutadiene mixture. The other working conditions remain unchanged. The coagulate has a similar appearance to that indicated in Example 5(a), but with somewhat more fine fractions.

(c) The previous experiment is repeated, but 0.2 part of sodium hexadecyl sulfonate (based on polymer) is continuously added to the latex, the operation in other respects being carried out as above. The coagulate shows the same appearance as in the preceding example, but has fewer fine fractions.

(d) In contrast to the previous experiments, no further emulsifier additive is incorporated into the polychlorobutadiene latex. A useful precipitation is also produced, but more fine coagulate particles are formed.

EXAMPLE 6

A latex of a copolymer of 80 parts of styrene and 20 parts of acrylonitrile (intrinsic viscosity 1.0) is mixed with a copolymer latex of 62 parts of butadiene and 38 parts of acrylonitrile (Defo-value 1500) so that 10 parts of the first-mentioned copolymer are used to 90 parts of the second copolymer, the latices containing diisobutyl naphthalene-sulfonic acid and sodium hexadecyl sulfonate as emulsifiers. The resulting latex mixture has a polymer content of 18%.

In a mixing nozzle, this latex mixture is mixed with the mixture of a 15% aqueous sodium chloride solution at 45° C. and with 3% of glacial acetic acid (based on 100 parts of common salt solution), so that the ratio between polymer and common salt solution is 1:0.9. After passing through a flow pipe with a residence time of 5 seconds, a strand-like, latex-freed coagulate is obtained, which can be washed out very easily.

EXAMPLE 7

A latex of a copolymer of 60 parts of butadiene, 36 parts of acrylonitrile and 4 parts of methacrylic acid with a polymer content of 32% (emulsifier: 5 parts of sodium hexadecyl sulfonate, based on polymer) is mixed in a mixing nozzle with the same quantity by volume of a 15% aqueous, sodium chloride solution and then passed through a flow pipe with a residence tim of 3½ seconds. A latex-free, strand-like coagulate is formed, which is broken up under the stirring action in the stirrer-type vessel into short pieces, but is free from fine fractions.

We claim:
1. A process for the continuous production of a porous strand of a coagulate from an emuslified rubber latex selected from the group consisting of polybutadiene, poly-2-methylbutadiene and polychlorobutadiene latices and copolymer latices thereof, having a rubber concentration of between 15 and 30% by weight, said process comprising the steps of mixing said latex with an aqueous inorganic salt solution in a mixing zone, the weight ratio of inorganic salt in said solution to solid rubber in said latex being between 0.5:1 and 1.2:1, passing a mixture of latex and inorganic salt solution prior to any substantial coagulation through a flow pipe under laminar flow conditions, the residence time in said flow pipe being between 2 and 20 seconds, and recovering from said flow pipe a continuous soft porous strand of latex-free rubber coagulate.

2. The process of claim 1 wherein said porous strand is washed free om impurities under conditions whereby said strand is comminuted into coarse pieces which are substantially free of fine particles.

3. The process of claim 1 wherein the latex is continuously introduced into a mixing nozzle, the salt solution is continuously introduced laterally into the mixing nozzle, and the resulting mixture then flows continuously through said flow pipe.

4. Process according to claim 1 wherein said aqueous inorganic salt solution is a 1–30% by weight soduim chloride solution.

5. Process according to claim 1 wherein said flow pipe has a diameter of 6–30 mm.

References Cited

UNITED STATES PATENTS

| | | | |
|---|---|---|---|
| 2,187,146 | 1/1940 | Calcott et al. | |
| 2,304,858 | 12/1942 | Stewart et al. | 260—821 |
| 2,366,460 | 1/1945 | Semon | 260—821 |
| 3,006,872 | 10/1961 | Benedict et al. | 260—29.7 |

MURRAY TILLMAN, Primary Examiner

M. FOELAK, Assistant Examiner

U.S. Cl. X.R.

260—29.7, 92.3, 94.2